United States Patent [19]

McCauley et al.

[11] Patent Number: 4,645,396
[45] Date of Patent: Feb. 24, 1987

[54] WOOD-METAL DRILL SCREW

[75] Inventors: Jon R. McCauley, Wabash, Ind.; Troy L. Smallwood, Campbellsville, Ky.; Paul Welliver, Decorah, Iowa

[73] Assignee: Textron Inc., Providence, R.I.

[21] Appl. No.: 683,382

[22] Filed: Dec. 19, 1984

[51] Int. Cl.⁴ .................................... F16B 25/00
[52] U.S. Cl. ........................ 411/387; 408/224; 10/152 T
[58] Field of Search ............... 411/386, 387, 416–418; 10/10 R, 152 R, 152 T; 408/227, 228, 224

[56] References Cited

U.S. PATENT DOCUMENTS

| | | | |
|---|---|---|---|
| 3,827,331 | 8/1974 | Mucnchinger | 411/387 |
| 3,982,464 | 9/1976 | Sygnator | 411/387 |
| 4,257,307 | 3/1981 | Regensburger | 411/387 |
| 4,480,951 | 11/1984 | Regensburger | 408/224 |

Primary Examiner—Thomas J. Holko
Assistant Examiner—Neill Wilson
Attorney, Agent, or Firm—Trexler, Bushnell & Wolters, Ltd.

[57] ABSTRACT

There is disclosed screw adapted to fasten two or more juxtaposed workpieces which comprises a threaded shank defining an axis and a major thread diameter. A drilling tip is provided which extends from the shank and includes a pair of cutting edges. Material removing extensions are formed continuously with the cutting edges and serve to extend the cutting edge in the radially outward direction at least as far as the radially outermost extent of the major thread diameter. The extensions are frangible and will fracture when a material of predetermined hardness is encountered. As such the fastener is adapted for drilling a first, enlarged bore in a first workpiece of relatively soft material, and a second smaller bore in a second workpiece of a harder material, such as metal, or the like.

13 Claims, 7 Drawing Figures

WOOD-METAL DRILL SCREW

BACKGROUND OF THE INVENTION

This invention relates generally to a screw, and more particularly relates to a drill screw adapted to be used in fastening two or more juxtaposed workpieces of dissimilar materials.

It is a common practice in fastening two workpieces together to provide a pilot hole in the first workpiece of a greater diameter than the major thread diameter of the screw to be utilized in fastening the two workpieces. Such workpieces may comprise two or more panels to be fastened in superimposed or juxtaposed relation, or may comprise a panel to be attached to a frame member or the like. In the absence of such a pilot hole, the threads of the screw might engage the first panel which would increase the driving force required to achieve the final assembly.

Similarly, in many applications a panel of a given material is to be fastened to a frame member of a second material of greater hardness than the material of the panel. For example, panels of wood or other fibrous material are attached to metal frame members in various constructions. In such constructions, it is desirable to provide such a pilot hole in the first workpiece or panel to reduce the amount of torque and "end-load" required to drive the drill screw through the underlying metal frame member. Such reduction in driving torque and "end-load" is reduces worker fatigue and drive tool wear.

Many prior art fasteners have been proposed which utilize one or more wing-like extensions or elements on the shank of the screw to bore a pilot hole in a first workpiece so that the threads of the screw will not engage this workpiece. Moreover, the wings or extensions of such a fastener are designed to break off upon encountering the second metallic workpiece or frame member. Note, for example U.S. Pat. Nos. 3,358,548; 3,699,841 and 3,982,464. While the prior art has proposed various designs for such wing-like extensions on the shank of the screw there is room for yet further improvement.

In particular, it should be recognized that the expense and difficulty of manufacture of such a drill screw should be minimized. Hence, the number and type of machining operations required to form the screw including such wings or extensions should also be held to a minimum of relatively simple machining or forming operations. Preferably in this regard precision machining operations should be avoided in favor of relatively simpler cold forming procedures.

OBJECTS OF THE INVENTION

Accordingly, it is a general object of this invention to provide a novel and improved drilling and reaming screw.

A more specific object is to provide a screw threaded fastener which is capable of providing a counterbore in a first workpiece, before drilling and tapping a hole in a second workpiece.

A further object is to provide a drilling and reaming threaded fastener including one or more projections or extensions adapted to perform reaming or counterboring of a first workpiece, and yet be adapted to be readily removed from the drill screw upon contact with a relatively harder following juxtaposed workpiece.

BRIEF DESCRIPTION OF THE DRAWINGS

The features of the present invention which are believed to be novel are set forth with particularity in the appended claims. The organization and matter of operation of the invention, together with further objects and advantages thereof, may best be understood by reference to the following detailed description of the illustrated embodiment taken in connection with the accompanying drawings in the several figures of which like reference numerals identify like elements, and in which:

DETAILED DESCRIPTION OF THE ILLUSTRATED EMBODIMENT

Figures 1, 2, 3, 4:
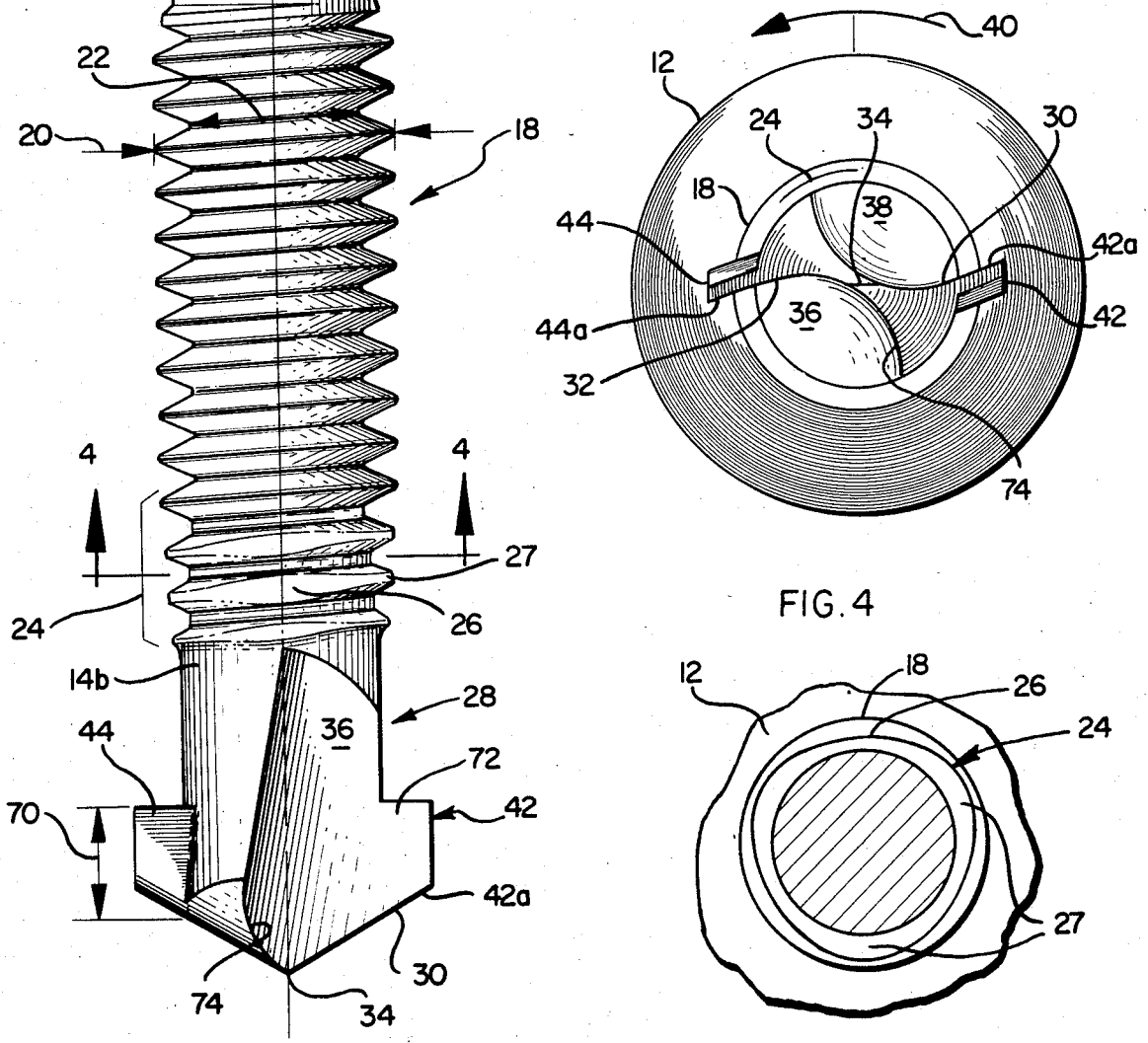
FIG. 1 is a plan view of a screw-type fastener configured in accordance with the present invention.
FIG. 2 is a plan view of an end portion of the screw of FIG. 1 rotated substantially 90 degrees to show further details thereof.
FIG. 3 is an end view of the screw of FIG. 1.
FIG. 4 is a sectional view taken generally along the line 4—4 of FIG. 1.

Referring now to the drawings and initially to FIGS. 1 through 4, a drill screw in accordance with the invention is designated generally by the reference numeral 10. The drill screw includes a driver head portion 12 and a shank portion 14 which defines an axis 15 and a diameter 16. A portion of this shank portion is threaded as indicated generally at 18, to define a major thread diameter 20 and a minor thread diameter 22.

In the illustrated embodiment, the thread 18 is preferably formed by a cold forming or rolling operation. That is, material of the shank 14 is displaced such that the major thread diameter 20 is larger than the diameter 16 of the shank 14 while the minor thread diameter 22 is less than the diameter 16. A leading end of the threaded portion 18 is additionally formed with a self-tapping screw thread configuration as indicated generally at reference numeral 24. It will be noted that the diameter of these threads 24 generally decreases as they lead out into a further unthreaded shank portion 14b which is of generally the same diameter as diameter 16 of the shank 14. This self-tapping thread configuration 24 preferably is of a tri-lobular design, provided by a series of alternating flats 26 and lobular portions 27. The foregoing configuration of threads 24 is well known under the trademark TAPTITE and is generally as shown in U.S. Pat. No. 3,195,156 and or such need not be described further in detail herein.

Referring now more particularly to the leading end portion of the screw 10, the leading shank portion 14b is formed with a drilling tip designated generally by reference numeral 28. This drilling tip includes a pair of generally complimentary oppositely extending and oppositely facing cutting edges 30, 32 at a leading end thereof. These cutting edges 30 and 32 are generally arcuately shaped in plan view as seen in FIG. 3 and extend axially and radially outwardly of a leading drill tip point 34. Generally axially continuously formed with the cutting edges 30 and 32 are respective axially upwardly extending drilling flutes 36 and 38. These drilling flutes are generally configured for carrying material removed or cut by the cutting edges 30, 32 generally axially upwardly and radially outwardly and away from the cutting edges 30, 32 as the drill screw 10 is rotated about its axis 15 in the direction indicated generally by arrow 40 in FIG. 3.

In accordance with a feature of the invention, material removing extensions 42, 44 are formed continuously with each of the cutting edges 30, 32. Each extension extends the associated cutting edge 30 or 32 in the radially outward direction at least as far as, and preferably beyond, the radially outermost extent of the major thread diameter 20. In this regard, the extension 42 will be seen in FIG. 1 to present an extended cutting edge portion 42a which extends substantially continuously from cutting edge 30. The extension 44 presents a substantially similar such cutting edge extension 44a.

Figure 5:
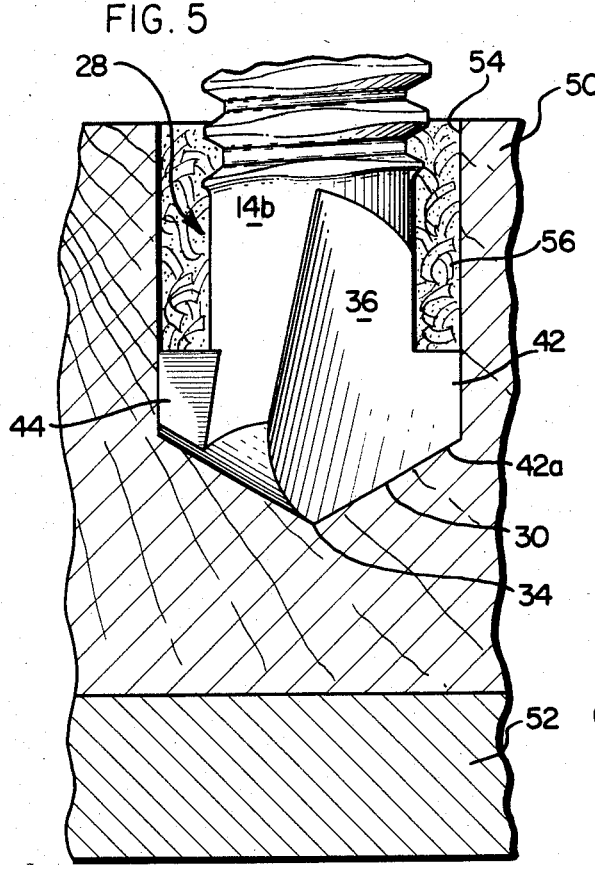
FIG. 5 is a plan view of the end portion of the screw of FIG. 1 illustrating initial boring and reaming of a first workpiece.
Figure 7:
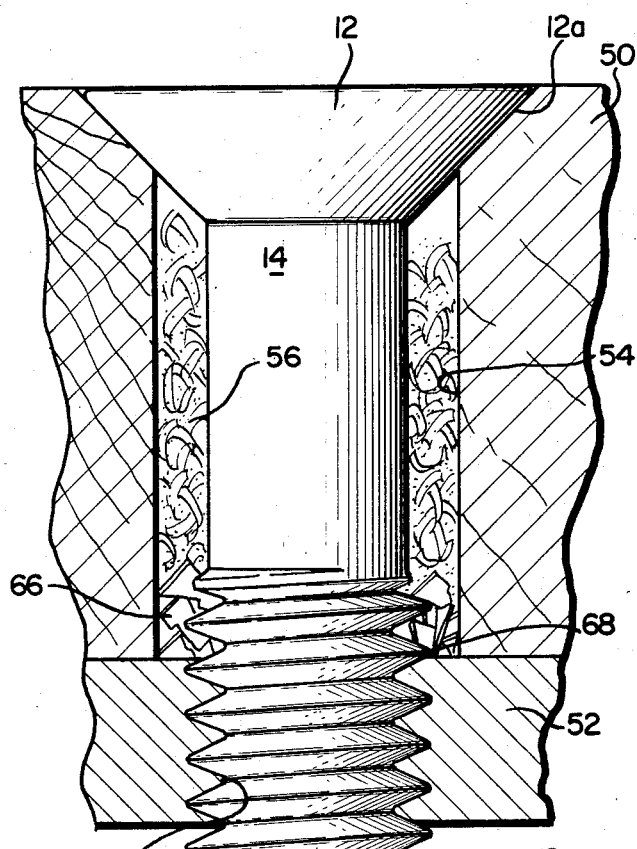
FIG. 7 is a plan view similar to FIG. 1 showing full advancement of the screw of the invention for fastening two workpieces together in juxtaposed relation.
Figure 6:
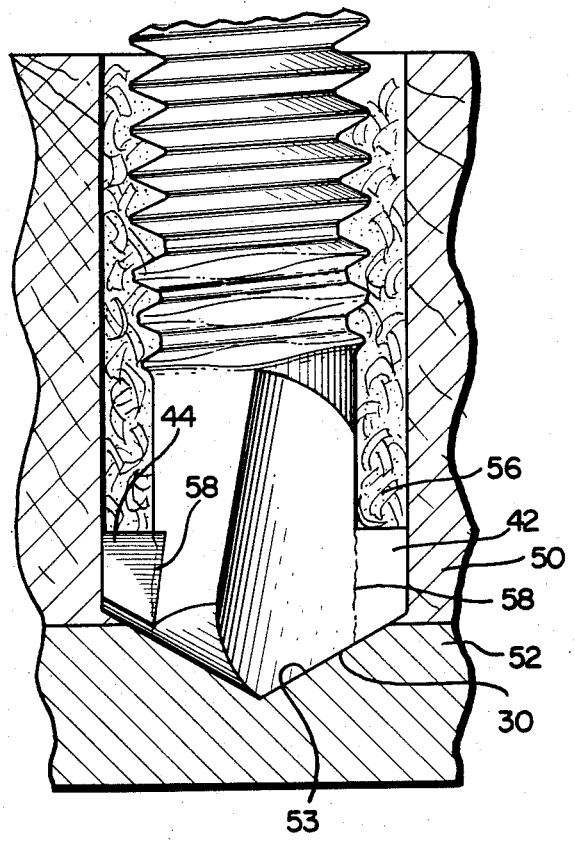
FIG. 6 is a plan view similar to FIG. 5 illustrating completion of drilling or boring of a first workpiece and initial drilling of a second, juxtaposed workpiece.

Advantageously, and referring now to FIGS. 5 through 7, these cutting edge extensions 42a and 44a in conjunction with the main cutting edges 30 and 32 serve to ream or drill an enlarged diameter bore or pilot hold 54 in a first workpiece or panel 50 of two workpieces or panels 50, 52 which are to be joined together in abutting or juxtaposed relation by the drill screw 10. As such, wood chips or other material removed from panel 50 to form bore 54 is indicated generally by reference numeral 56. In this regard, the formation of such an enlarged diameter bore or pilot hole 54 in the first panel 50 assures that the following threads 18 will not engage the panel 50. This permits the threads to engage panel or workpiece 52 and the drill screw 10 to hold the two panels or workpieces 50, 52 together in juxtaposed relationship. Absent such an enlarged diameter pilot hole, the threads of the screw might engage the first panel or workpiece 50 and the rate of penetration of the screw into the second workpiece or panel may be different than the rate of movement between the threads of the screw and the first workpiece or panel. This would tend to prevent the panels from coming together. Additionally, such an enlarged diameter bore or pilot hole permits reduction in the amount of torque required to drive the drill screw for penetrating and threadably engaging the second workpiece or panel 52. Such reduction in torque advantageously reduces worker fatigue and drive tool wear.

Moreover, the extensions 42 and 44 are preferably of relatively narrow dimension 60 (see FIG. 2) with respect to the circumference of the screw 10 so as to render them frangible and thus removable from the drilling tip 28 in response to a predetermined force applied thereto. In the embodiment illustrated in FIGS. 5 through 7 this predetermined force comprises the force encountered by the extensions as the screw completes travel through the first workpiece 50, which is of a given hardness, and encounters the following workpiece 52, which is preferably of a greater hardness. For example, the drill screw 10 of the invention may most advantageously be utilized in securing panels or members of wood or other fibrous material to metal frame members, or the like.

Referring also to FIGS. 6 and 7, in FIG. 6 the cutting edges 30, 32 are shown as they initially encounter and penetrate the second panel or workpiece 52, and start to drill a bore or opertive 53 therein. At this point in the drilling operation, the amount of force on the drill tip is increased due to the increase hardnes of the workpiece 52. The dimensions of the extensions 42 and 44 are selected such that they cannot withstand the increased forces and end-load, and will fracture, as indicated at 58, FIG. 6. In FIG. 7, the screw 10 is shown fully advanced with an enlarged undersurface surface portion 12a of driver head 12 and threads 18, respectively holding the respective workpieces or panels 50 and 52 together in abutting or juxtaposed relation. In this regard, the frangible extensions 42 and 44 will be seen in FIG. 7 to have fractured and are thus severed from the drill tip 28. This leaves surfaces 62, 64 of a radially extension generally no more than the diameter 16 of shank portion 14b, and a plurality of shards or broken pieces of the respective extensions designated generally by reference numerals 66 and 68, within the counterbore 54. Referring again briefly to FIG. 1, to further assure the frangibility of the extensions 42 and 44 in this fashion they are also formed to leave a limited axial extent. To this end, in the illustrated embodiment the axial extent of the respective extensions 42 and 44 is indicated generally by reference numeral 70 (on extension 44). It will be noted that this axial extent 70 from the cutting edge to the axially upper end of each extension 42, 44 is substantially less than the axial extent of the respective drilling flutes 36 and 38 for example, and much less than the axial length of the drilling tip portion 28.

Further, after the frangible extension 42 and 44 have fractured, the drill tip 28 will complete the drilling of the bore or aperture 53 in the second workpiece 52. As the fastener 10 is advanced, the internal thread forming configuration 24 of the threaded portion 18 will be engaged in the bore 53. The thread forming configuration 24 will cold work the material of the workpiece 52 about the bore 53 to form an internal or female thread 55 which is designed for mating engagement with the standard threads provided on the threaded section 18. It is this engagement between the threads 55 and 18 which maintain the workpiece 50 and 52 in assembled engagement.

It will be further noted that leading surfaces (with repsect to direction of rotation 40) of respective extensions 42 and 44, such as surface 72 of extension 42 in FIG. 1 are substantially continuously formed and of continuous curvature with the respective drilling flutes 36, 38. Hence, for example, extension 42 presents not only a substantially continuously formed and continuously curved cutting edge 42a with cutting edge 30 but also a substantially continuously curved and formed surface 72 with associated drilling flute 36. As can be appreciated, the cutting edge extension 42a and 44a can be formed simultaneously with the cutting edges 30 and 32, and with a single machining operation. In this regard, it will be noted that respective drilling flutes 36 and 38 form a substantially continuous arc of curvature from the associated cutting edges 30 and 32 and extend continuously axially upwardly therefrom. A trailing edge of each of these drilling flutes 36, 38 (with respect to direction of rotation 40) extends again radially outwardly, as indicated at reference numeral 74 with respect to drilling flute 36, so as to help catch and carry off wood chips and other material 56 reamed or bored by the cutting edge 30 and extension 42a as the drill screw 10 enters and bores through the respective workpiece 50.

As is believed clear from the above discussion, the combination drilling and reaming screw of the present invention can be inexpensively fabricated. More specifically, upon initial cold forming of the drill tip 28, the extensions 42 and 44 can be formed to size at the same time and with the sam dies used to define the drill tip flutes 36 and 38. Further, when the drill tip 28 is machined to define the basic or primary cutting edges 30 and 32, the cutting edge extensions 42a and 44a are also machined during the same operation.

Further the present invention is an improvement over the prior art designs as mentioned above, in that full cutting edges, viz., 30 plus 42a, and 32 plus 44a, are available to form or cut the bore 54. With the prior art designs the basic drill tip cutting edgs are used to form a primary bore, with reaming wings, or the like, employed to enlarge the primary bore to final size. The present invention is believed to reduce the amount endload and driving torque required to perform the final seating opration, and thus reduces operation fatigue.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A screw adapted to fasten two or more juxtaposed workpieces comprising: a threaded shank defining an axis and a major thread diameter; a drilling tip including at least one cutting edge at a leading end thereof; and a material removing extension formed continuously with said cutting edge and extending the cutting edge in the radially outward direction at least as far as the radially outermost extent of said major thread diameter, said extension defining a relatively narrow dimension with respect to a circumference of said screw so as to be frangibly removable from said drilling tip in response to a predetermined force applied thereto.

2. A screw according to claim 1 wherein said drilling tip includes a pair of generally oppositely extending ones of said cutting edges, and wherein one said material removing extension is formed continuously with each of said cutting edges.

3. A screw according to claim 1 and further including a drilling flute of a predetermined axial extent associated with said cutting edge and wherein said extension extends from said cutting edge in the axial direction for a predetermined distance substantially less than the axial extent of said drilling flute.

4. A screw according to claim 1 wherein said predetermined force comprises the force encountered by said extension as said screw completes travel through a first workpiece of given hardness and encounters a following workpiece of greater hardness.

5. A screw adapted to fasten two or more juxtaposed workpieces comprising: a threaded shank defining an axis and a major thread diameter; a drilling tip including at least one cutting edge at a leading end thereof; and a material removing extention formed continuously with said cutting edge and extending the cutting edge in the radially outward direction at least as far as the radially outermost extent of said major thread diameter; said extension being frangibly removable from said drilling tip in response to a predetermined force applied thereto.

6. A screw according to claim 5 wherein said drilling tip includes a pair of generally oppositely extending ones of said cutting edges, and wherein one said material removing extension is formed continuously with each of said cutting edges.

7. A screw according to claim 5 and further including a drilling flute of a predetermined axial extent associated with said cutting edge and wherein said extension extends from said cutting edge in the axial direction for a predetermind distance substantially less than the axial extent of said drilling flute.

8. A screw according to claim 5 wherein said extension defines a relatively narrow dimension with respect to a circumference of said screw.

9. A screw according to claim 5 wherein said predetermined force comprises the force encountered by said extension as said screw completes travel through a first workpiece of given hardness and encounters a following workpiece of greater hardness.

10. A screw fastener member for fastening two or more workpieces together, comprising: a shank having driving means at one end, a drill tip at the other end and a threaded portion intermediate said drill tip and said driving means; said drilling tip including a pair of cutting edges and a pair of drill flutes; and a pair of radially disposed extensions formed on said drill tip, said extensions being disposed generally continuously with respect to said cutting edges, and including cutting edge extensions that are continuous with said drill tip cutting edges, said that the effective length of the respective cutting edges extend radially at least as far as the major thread diameter, and said extensions being frangible in response to a predetermined force.

11. A screw fastener according to claim 10 wherein the axial extends of said extensions is less than that of the associated drill tip flutes.

12. A screw fastener according to claim 10 wherein said threaded portion includes lead in portion having a self-tapping configuration.

13. A screw fastener according to claim 12 wherein said self-tapping configuration includes a plurality of tri-lobular thread turns.

* * * * *